United States Patent
Bae et al.

(10) Patent No.: US 9,012,074 B2
(45) Date of Patent: Apr. 21, 2015

(54) ELECTRODE FOR LITHIUM SECONDARY BATTERY AND LITHIUM SECONDARY BATTERY INCLUDING SAME

(75) Inventors: Tae-Hyun Bae, Yongin-si (KR); Woo-Cheol Shin, Yongin-si (KR); Sang-Il Han, Yongin-si (KR); Myung-Hwan Jeong, Yongin-si (KR); Jung-Yi Yu, Yongin-si (KR); Min-Ju Lee, Yongin-si (KR); Sang-Geun Kim, Yongin-si (KR); Mi-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 101 days.

(21) Appl. No.: 13/558,320

(22) Filed: Jul. 25, 2012

(65) Prior Publication Data

US 2013/0183590 A1    Jul. 18, 2013

(30) Foreign Application Priority Data

Jan. 17, 2012    (KR) .................. 10-2012-0005258

(51) Int. Cl.
*H01M 4/02*    (2006.01)
*H01M 4/04*    (2006.01)

(52) U.S. Cl.
CPC . *H01M 4/02* (2013.01); *H01M 4/04* (2013.01)

(58) Field of Classification Search
None
See application file for complete search history.

(56) References Cited

U.S. PATENT DOCUMENTS

| 6,093,503 | A * | 7/2000 | Isoyama et al. ............. 429/61 |
| 2003/0049535 | A1 * | 3/2003 | Ohta et al. ............. 429/231.8 |
| 2005/0069775 | A1 * | 3/2005 | Hwang et al. ............ 429/231.95 |
| 2009/0202915 | A1 * | 8/2009 | Modeki et al. ............ 429/246 |
| 2010/0294985 | A1 * | 11/2010 | Suhara et al. ............ 252/182.1 |
| 2010/0310943 | A1 * | 12/2010 | Koh et al. ............ 429/332 |
| 2011/0003210 | A1 | 1/2011 | Lim et al. |

FOREIGN PATENT DOCUMENTS

| JP | 07-235329 | 9/1995 |
| JP | 11-031510 | 2/1999 |
| JP | 2011-12238 A | 1/2011 |
| JP | 2011-076748 A | 4/2011 |
| KR | 10-2004-0021955 A | 3/2004 |
| KR | 10-2011-0003131 A | 1/2011 |

OTHER PUBLICATIONS

Machine English Translation of JP 07-235329, 9 pages.
Machine English Translation of JP 11-031510, 10 pages.
Machine English Translation of JP 2011-076748, 14 pages.

* cited by examiner

*Primary Examiner* — Ula C Ruddock
*Assistant Examiner* — Scott J Chmielecki
(74) *Attorney, Agent, or Firm* — Christie, Parker & Hale, LLP (57) ABSTRACT

An electrode for a lithium secondary battery, including a surface having surface roughness of about 800 nm to about 1000 nm, and a lithium secondary battery including the same. In one embodiment, the lithium secondary battery has improved cycle-life characteristics.

15 Claims, 6 Drawing Sheets
(3 of 6 Drawing Sheet(s) Filed in Color)

ELECTRODE FOR LITHIUM SECONDARY BATTERY AND LITHIUM SECONDARY BATTERY INCLUDING SAME

RELATED APPLICATION

This application claims priority to and the benefit of Korean Patent Application No. 10-2012-0005258 filed in the Korean Intellectual Property Office on Jan. 17, 2012, the entire content of which is incorporated herein by reference.

BACKGROUND

1. Field

An electrode for a lithium secondary battery, and a lithium secondary battery including the same are disclosed.

2. Description of the Related Art

Batteries transform chemical energy generated from the electrochemical redox reaction of a chemical material therein into electrical energy. Such batteries are divided into a primary battery, which should be disposed of when its energy is all consumed, and a secondary battery, which can be recharged many times. The secondary battery can be many times charged/discharged due to the reversible transformation between chemical energy and electrical energy.

Recent development in high-tech electronics has allowed electronic devices to become smaller and lighter in weight, which leads to increasing use of portable electronic devices. These portable electronic devices batteries increasingly require a battery with high energy density as a power source. As such, researches on lithium secondary batteries are rigorously under progress.

In general, a lithium secondary battery includes an electrode fabricated by mixing an electrode active material, a binder, and a conductive material to prepare a slurry, coating the slurry on an electrode, and then, drying and compressing it. The binder conventionally includes polyvinylidenefluoride or a styrene-butadiene rubber.

SUMMARY

An aspect of an embodiment of the present invention is directed toward an electrode for a lithium secondary battery capable of improving cycle-life characteristics of a lithium secondary battery.

An aspect of an embodiment of the present invention is directed toward a lithium secondary battery including the electrode.

According to one embodiment of the present invention, an electrode for a lithium secondary battery, including a surface having a surface roughness of about 800 nm to about 1000 nm is provided.

The surface of the electrode may include an O (oxygen) atom-containing functional group on the surface thereof.

The O (oxygen) atom-containing functional group may include a ketone group or an ester group.

The surface of the electrode may have a surface energy of about 45 mN/cm to about 60 mN/cm.

The surface of the electrode may have a surface having a contact angle of about 60 degrees to about 80 degrees with respect to water.

The surface of the electrode may have a surface having a contact angle of about 24 degrees to about 30 degrees with respect to diiodomethane.

The electrode may include a current collector and an active material layer, and the surface roughness may be provided on the surface of the active material layer.

The electrode may be a negative electrode.

Accordingly, the active material layer of the negative electrode may include a carbon-based negative active material.

According to another embodiment of the present invention, provided is a method of manufacturing an electrode for a lithium secondary battery that includes preparing an electrode including an active material layer on a current collector; and radiating atmospheric plasma on a surface of the active material layer of the electrode, and then, surface-modifying the surface of the active material layer to have a surface roughness ranging from about 800 nm to about 1000 nm.

The surface-modifying may be performed by radiating atmospheric plasma under a discharge current ranging from about 1800 mA to about 2000 mA and discharge electric power ranging from about 2750 W to about 3000 W.

The atmospheric plasma may be produced by applying high voltages two plasma discharge electrodes under an atmosphere. The plasma discharge electrode may be about 1 mm to about 3 mm apart from an electrode for surface-modifying.

In addition, the plasma discharge electrode radiates atmospheric plasma while it passes the electrode at a speed ranging from about 8 m/min to about 10 m/min.

The surface-modifying may be performed by radiating the atmospheric plasma under about 1 atm to 1.5 atm and about 22° C. to 30° C.

According to yet another embodiment of the present invention, provided is a lithium secondary battery including a first electrode, wherein the first electrode is the above described electrode; a second electrode; a separator; and an electrolyte.

The first electrode may be a negative electrode, and the second electrode may be a positive electrode.

The electrolyte may include a fluorine-substituted carbonate-based solvent.

An embodiment of the lithium secondary battery has improved cycle-life characteristics.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Exemplary embodiments of this disclosure will hereinafter be described in detail. However, these embodiments are exemplary, and this disclosure is not limited thereto.

According to an embodiment of the present invention, an electrode for a lithium secondary battery having surface roughness ranging from about 800 nm to about 1000 nm is provided. In one embodiment, the electrode having surface roughness within the above range improves cycle-life characteristics of a lithium secondary battery. In one embodiment, the surface roughness may refer to the maximum peak height (Rpv) or root mean square (Rq).

The surface of the electrode for a lithium secondary battery may be surface-modified in order to have the surface roughness within the range. This electrode with surface roughness within the set or predetermined range may be provided by a method of fabricating an electrode that will be described below. However, the surface modifying of an electrode for a lithium secondary battery is not limited to an atmospheric plasma treatment but may include any well-known suitable surface-modifying treatment, as long as it brings about surface roughness within the range. For example, the surface-modifying may be performed by a Corona discharge treatment, an E-beam treatment, an ion plating treatment, and the like.

The electrode for a lithium secondary battery may include an O (oxygen) atom-containing functional group, for example, a ketone group or an ester group at its surface.

The surface-modified electrode having surface roughness within the range may have surface energy ranging from about 45 mN/cm to about 60 mN/cm.

The surface-modified electrode for a lithium secondary battery may be better impregnated in an electrolyte. In particular, the electrode with surface roughness within the range may remarkably improve cycle-life characteristics of a lithium secondary battery. For example, the surface-modified electrode with surface roughness within the range may have a contact angle ranging from about 60 degrees to about 80 degrees with respect to water. According to another embodiment of the present invention, the surface-modified electrode with surface roughness within the range has a contact angle ranging from 24 degrees to about 30 degrees with respect to diiodomethane.

The electrode may be a negative electrode or a positive electrode. The electrode may include a current collector and an active material layer on the current collector. Herein, the modified surface refers to a surface of the active material layer. The active material layer may include an active material. For example, when the electrode is a negative electrode, the active material layer is a negative active material layer. The negative active material layer includes a negative active material. On the other hand, when the electrode is a positive electrode, the active material layer is a positive active material layer. The positive active material layer includes a positive active material.

When the electrode is a negative electrode, the current collector may be a copper foil, a nickel foil, a stainless steel foil, a titanium foil, a nickel foam, a copper foam, a polymer substrate coated with a conductive metal, or a combination thereof.

The negative active material includes a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions includes a carbon material. The carbon material may be any suitable carbon-based negative active material generally used in a lithium ion secondary battery. Examples of the carbon material include crystalline carbon, amorphous carbon, and a mixture thereof. The crystalline carbon may be non-shaped, or sheet, flake, spherical, or fiber-shaped natural graphite or artificial graphite. The amorphous carbon may be a soft carbon, a hard carbon, a mesophase pitch carbonized product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ (0<x<2), an Si—C composite, an Si-Q alloy (wherein Q is an element selected from alkali metals, alkaline-earth metals, group 13 to 16 elements, transition elements, rare earth elements, and combinations thereof, and is not Si), Sn, $SnO_2$, an Sn—C composite, an Sn—R alloy (wherein R is an element selected from alkali metals, alkaline-earth metals, group 13 to 16 elements, transition elements, rare earth elements and combinations thereof, and is not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

Examples of the transition metal oxide include vanadium oxide, lithium vanadium oxide, and the like.

In one embodiment, the negative active material may be a carbon-based material.

The negative active material layer also includes a binder and optionally a conductive material.

The binder improves binding properties of the positive active material particles to one another and also, with a current collector. The binder may include a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber, polyvinylalcohol, sodium polyacrylate, a copolymer of propylene and C2 to C8 olefin, a copolymer of (meth)acrylic acid and (meth) acrylic acid alkylester, or a combination thereof.

When the water-soluble binder is used as a negative electrode binder, a cellulose-based compound may be further used to provide viscosity. The cellulose-based compound includes one or more of carboxylmethyl cellulose, hydroxypropyl cellulose, hydroxypropylmethyl cellulose, diacetyl cellulose, methyl cellulose, or alkaline metal salts thereof. The alkaline metal may be Na, K, or Li.

The cellulose-based compound may be included in an amount of about 0.1 to about 3 parts by weight based on 100 parts by weight of the negative active material.

styrene-butadiene rubber, an epoxy resin, nylon, and the like but are not limited thereto.

The conductive material is included to improve electrode conductivity. Any electrically conductive material may be used unless it causes a chemical change. Examples of the conductive material include a carbon-based material such as natural graphite, artificial graphite, carbon black, acetylene black, ketjen black, carbon fiber, or the like; a metal-based material such as a metal powder or a metal fiber including copper, nickel, aluminum, silver, or the like; a conductive polymer such as a polyphenylene derivative, and the like; and a mixture thereof.

When the electrode is a positive electrode, the current collector may be Al (aluminum) but is not limited thereto.

The positive active material includes a lithiated intercalation compound that reversibly intercalates and deintercalates lithium ions. The positive active material may include a composite oxide including at least one selected from the group consisting of cobalt, manganese, and nickel, as well as lithium. In particular, the following compounds may be used:
$Li_aA_{1-b}R_bD_2$ (0.90≤a≤1.8 and 0≤b≤0.5); $Li_aE_{1-b}R_bO_{2-c}D_c$ (0.90≤a≤1.8, 0≤b≤0.5 and 0≤c≤0.05); $LiE_{2-b}R_bO_{4-c}D_c$ (0≤b≤0.5, 0≤c≤0.05); $Li_aNi_{1-b-c}Co_bR_cD_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cD_\alpha$ (0.90≤a≤1.8, 0≤b≤0.5, 0≤c≤0.05 and 0<α≤2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0<α<2); $Li_aNi_bE_cG_dO_2$ (0.90≤a≤1.8, 0≤b≤0.9, 0≤c≤0.5 and 0.001≤d≤0.1); $Li_aNi_bCo_cMn_dG_eO_2$ (0.90≤a≤1.8, 0≤b≤0.9, 0≤c≤0.5, 0≤d≤0.5 and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The foregoing compound may have a coating layer on the surface or may be mixed with a compound having a coating layer. The coating layer may include a coating element compound selected from the group consisting of oxides of the coating element, hydroxides of the coating element, oxyhydroxides of the coating element, oxycarbonates of the coating element, and hydroxyl carbonates of the coating element. The compounds for the coating layer may be amorphous or crystalline. The coating element for the coating layer may include Mg, Al, Co, K, Na, Ca, Si, Ti, V, Sn, Ge, Ga, B, As, Zr, or a mixture thereof. The coating layer may be formed in any method having no negative influence on properties of a positive active material by including these elements in the compound. For example, the method may include any suitable coating method such as spray coating, dipping, and the like, but is not illustrated in more detail, because it is well-known to those who work in the related field.

The positive active material layer may include a binder and a conductive material.

The binder improves binding properties of the positive active material particles to one another and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like but are not limited thereto.

The conductive material is used to provide conductivity to an electrode. The conductive material may include any suitable electronic conductive materials (e.g., any electronic materials that do not cause a detrimental chemical change of a battery including the same). For example, it may include natural graphite, artificial graphite, carbon black, acetylene black, ketjen black, carbon fiber, metal powder, metal fiber or the like such as copper, nickel, aluminum, silver or the like, or at least one kind of mixture of conductive materials such as a polyphenylene derivative or the like.

When the electrode is a negative electrode or a positive electrode, the electrodes may be fabricated in a method including mixing the active material, a conductive material, and a binder to prepare an active material composition, and coating the composition on a current collector, respectively. The electrode-manufacturing method is well known and thus, is not described in detail in the present specification. The solvent may include N-methylpyrrolidone or the like but is not limited thereto.

The electrode for a lithium secondary battery according to one embodiment of the present invention may be a negative electrode.

In another embodiment of the present invention, a method of manufacturing the electrode for a lithium secondary battery is provided. The method of manufacturing an electrode for a lithium secondary battery includes preparing an electrode including an active material layer on a current collector; and surface-modifying the active material layer to have a surface roughness of about 800 nm to about 1000 nm by radiating atmospheric plasma on the surface of the active material layer of the electrode.

The surface-modifying may be performed by radiating atmospheric plasma under a discharge current ranging from about 1800 mA to about 2000 mA and discharge electric power ranging from 2750 W to 3000 W.

The atmospheric plasma may be produced by applying high voltages to two plasma discharge electrodes under atmosphere. Herein, the plasma discharge electrode is about 1 mm to about 3 mm apart from an electrode for surface-modifying. The plasma discharge electrode passes the electrode at a speed ranging from about 8 m/min to about 10 m/min.

The surface-modifying may be performed by radiating the atmospheric plasma under about 1 atm to 1.5 atm at about 22° C. to 30° C.

In yet another embodiment of the present invention, a lithium secondary battery that includes the electrode for a lithium secondary battery as a first electrode, a second electrode, a separator, and an electrolyte is provided.

The lithium secondary battery may be classified as either a lithium ion battery, a lithium ion polymer battery, or a lithium polymer battery according to the kind of separator used therein and/or the kind of electrolyte used therein. The lithium secondary batteries may have a variety of suitable shapes and sizes, for example, includes cylindrical, prismatic, coin, or pouch-shape batteries. In addition, it may be thin film batteries or rather bulky in size. Structures and fabricating methods for the batteries pertaining to the present invention are well known in the art and will not be illustrated in detail.

Figure 1:
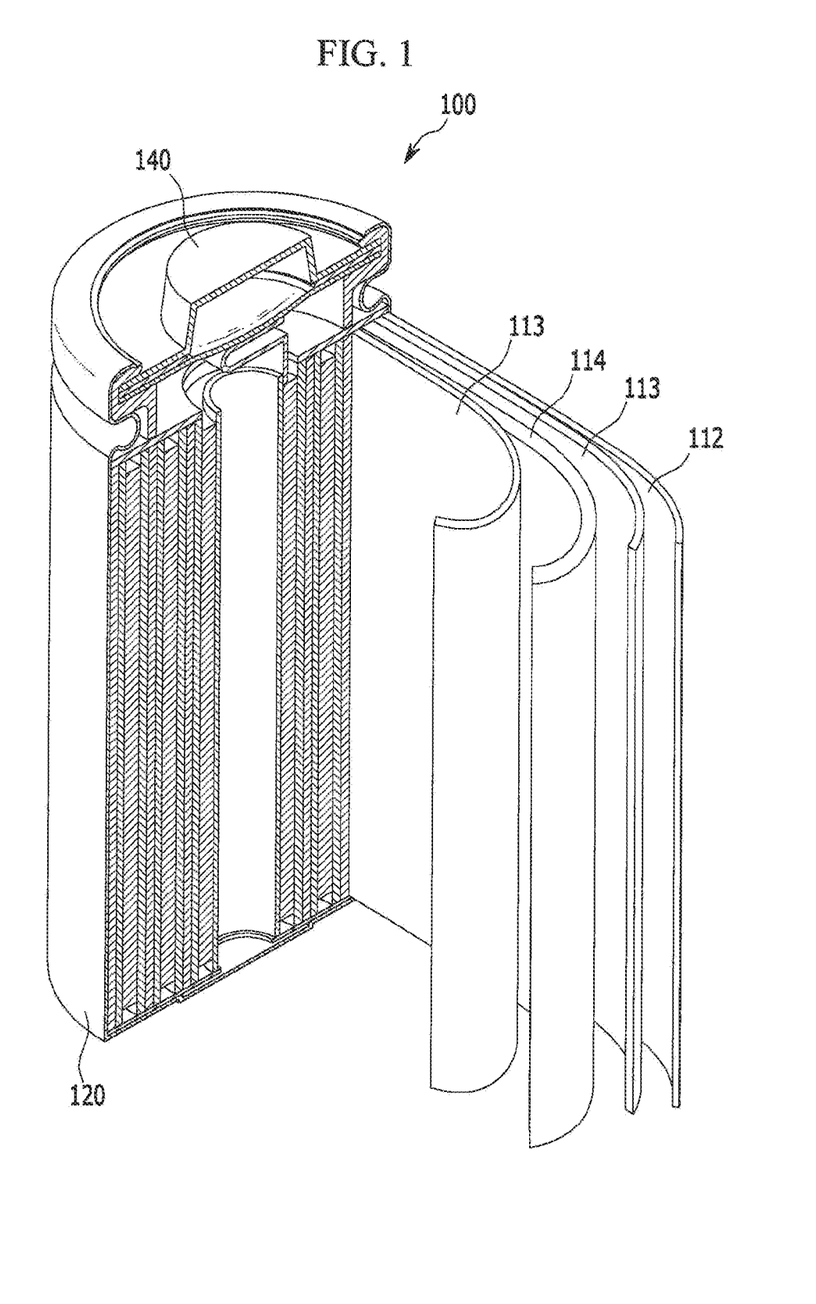
FIG. 1 is a schematic view showing a lithium secondary battery in accordance with one embodiment of the present invention.

FIG. 1 is an exploded perspective view showing a lithium secondary battery according to one embodiment. Referring to FIG. 1, the lithium secondary battery 100 is a cylindrical battery that includes a negative electrode 112; a positive electrode 114; a separator 113 disposed between the negative electrode 112 and the positive electrode 114; an electrolyte impregnating the negative and positive electrodes 112 and 114 and the separator 113; a battery case 120; and a sealing member 140 sealing the battery case 120. The lithium secondary battery 100 is fabricated by sequentially stacking the negative electrode 112, the separator 113, and the positive electrode 114; spirally winding them; and housing the spiral-wound product in the battery case 120.

The first electrode is the same as the electrode for a lithium secondary battery described above.

In the lithium secondary battery according to one embodiment of the present invention, the first electrode may be a negative electrode, while the second electrode may be a positive electrode.

The electrolyte may further include a, non-aqueous organic solvent and a lithium salt.

The non-aqueous organic solvent plays a role of transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like, and the ester-based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent may include cyclohexanone, or the like. The alcohol-based solvent may include ethanol, isopropyl alcohol, or the like. The aprotic solvent may include nitriles such as R—CN (wherein R is a C2 to C20 linear, branched or cyclic hydrocarbon group and may include a double bond, an aromatic ring, or an ether bond), amides (such as dimethylformamide or dimethylacetamide), dioxanes (such as 1,3-dioxolane or sulfolanes), or the like.

The non-aqueous organic solvent may be used singularly or in a mixture. When the organic solvent is used in a mixture, its mixture ratio may be controlled in accordance with desirable performance of a battery.

The carbonate-based solvent may include a mixture of a cyclic carbonate and a linear carbonate. The cyclic carbonate and the linear carbonate are mixed together in a volume ratio of about 1:1 to about 1:9. Thus, the electrolyte may have enhanced performance.

The electrolyte of the present invention may further include the aromatic hydrocarbon-based solvent as well as the carbonate-based solvent. The carbonate-based solvent and the aromatic hydrocarbon-based solvent are mixed together in a volume ratio of about 1:1 to about 30:1.

The aromatic hydrocarbon-based organic solvent may be an aromatic hydrocarbon-based compound represented by the following Chemical Formula 1.

Chemical Formula 1

In Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound represented by the following Chemical Formula 2 in order to improve cycle-life of a battery.

Chemical Formula 2

In Chemical Formula 2, $R_7$ and $R_8$ are each independently hydrogen, a halogen, a cyano group (CN), a nitro group ($NO_2$) or a C1 to C5 fluoroalkyl group, provided that at least one of $R_7$ and $R_8$ is a halogen, a cyano group (CN), a nitro group ($NO_2$) or a C1 to C5 fluoroalkyl group.

The ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, or the like. The use amount of the vinylene carbonate or the ethylene carbonate-based compound may be adjusted in an appropriate range in order to improve cycle-life.

The lithium salt dissolved in the non-aqueous organic solvent supplies a battery with lithium ions, basically operates a lithium secondary battery, and improves lithium ion transportation between positive and negative electrodes. The lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)$ (where x and y are natural numbers), LiCl, LiI, $LiB(C_2O_4)_2$ (lithium bisoxalate borate; LiBOB), or a combination thereof, which is a supporting electrolytic salt. The lithium salt may be used in a concentration of about 0.1M to about 2.0M. In one embodiment, when the lithium salt is included within the above concentration range, electrolyte performance and lithium ion mobility are enhanced due to appropriate electrolyte conductivity and viscosity.

The lithium secondary battery according to one embodiment of the present invention may include an electrolyte including a fluorine-substituted carbonate-based solvent.

The fluorine-substituted carbonate-based solvent may include fluoroethylene carbonate, difluoroethylene carbonate, fluorodimethyl carbonate, fluoroethylmethyl carbonate, or a combination thereof, and the fluorine-substituted carbonate-based solvent may be used in an amount of about 5 to about 30 parts by weight based on 100 parts by weight of the electrolyte for a lithium secondary battery.

The fluorine-substituted carbonate-based solvent is partly reduced and decomposed and thus, forms a stable solid electrolyte solution interface (SEI) film on the surface of a negative electrode. The fluorine-substituted carbonate-based solvent included in an electrolyte may not increase viscosity, but may form a desirable layer including LiF in a large amount and thus, may effectively remove exothermic reaction between an electrode active material and an electrolyte. According to one embodiment of the present invention, an electrode for a lithium secondary battery has a modified surface, and a more stable SEI layer is formed thereon. In other words, the aforementioned surface-modified electrode has a potential in a gradient on the surface that can reduce/decompose a carbonate-based solvent at a lower potential. As such, the carbonate-based solvent is reduced/decomposed at this lower potential and forms a more stable SEI layer.

Referring back to FIG. 1, the separator 113 separates the negative electrode 112 and the positive electrode 114 and plays a role of a passage through which lithium ions move and may include any common separator used in a lithium battery. In other words and according to one embodiment, the separator may have low resistance against ion movement in an electrolyte but excellent immersing capability for the electrolyte. For example, the separator may be selected from glass fiber, polyester, TEFLON (tetrafluoroethylne), polyethylene, polypropylene, polytetrafluoroethylene (PTFE), or a combination thereof and may be a non-woven fabric or a cloth. For example, a lithium ion battery may include a polyolefin-based polymer separator such as polyethylene, polypropylene, or the like and a separator coated with a ceramic component or a polymer material to secure heat resistance or mechanical strength and may have selectively a single layer or multi-layers.

The following examples illustrate the present invention in more detail. These examples, however, should not in any sense be interpreted as limiting the scope of the present invention.

EXAMPLE

Example 1

Fabrication of Negative Electrode

An electrode for a negative electrode was fabricated by mixing a graphite active material, carboxylmethyl cellulose (CMC), and a styrene butadiene resin (SBR) in a weight ratio of 98:1:1 in water to prepare negative active material slurry, coating the negative active material slurry on a copper current collector, and drying and compressing it.

The negative active material layer surface of the electrode was treated with atmospheric plasma under an atmospheric pressure of 1 atm and a room temperature of 25° C.° to prepare the negative electrode. The treatment process was performed under such conditions as 1800 mA of a discharge current and 2800 W of discharge electric power. Herein, the plasma discharge electrode was 1 mm apart from the electrode for surface-modifying and passed the electrode at a speed of 8 m/min.

Example 2

Fabrication of Negative Electrode

An electrode for a negative electrode was fabricated according to the same method as Example 1 and then, treated with atmospheric plasma under an atmospheric pressure of 1 atm at a room temperature of 25° C. Herein, the treatment process was performed under such conditions as 2000 mA of a discharge current and 3000 W of discharge electric power. Herein, the plasma discharge electrode was 3 mm apart from the electrode for surface-modifying and passed the electrode at a speed of 10 m/min.

Comparative Example 1

Fabrication of Negative Electrode

A negative electrode was fabricated according to the same method as Example 1 but not treated with atmospheric plasma.

Comparative Example 2

Fabrication of Negative Electrode

A negative electrode was fabricated according to the same method as Example 1 and was treated with atmospheric plasma under an atmospheric pressure of 1 atm at a room temperature of 25° C. Herein, the treatment process was performed under such conditions as 2500 mA of a discharge current and 3000 W of discharge electric power. Herein, the plasma discharge electrode was 3 mm apart from the electrode for surface-modifying and passed the electrode at a speed of 8 m/min.

Example 3

Fabrication of Lithium Secondary Battery Cell

The negative electrode according to Example 1 was used to fabricate a 18650 cylindrical cell. As for a positive electrode, $LiCoO_2$ was used. Then, a separator of polyethylene with a thickness of 18 μm was inserted between the negative and positive electrodes as shown in FIG. 1. The product was spiral-wound and inserted into a can, and an electrolyte was injected therein. Then, the can was sealed, thereby completing fabrication of a cell. The electrolyte was prepared by mixing EC(ethylenecarbonate)/DMC(dimethylcarbonate)/EMC(ethylmethylcarbonate) in a volume ratio of 3/4/3 and dissolving $LiPF_6$ in a concentration of 1.3M.

Comparative Example 3

Fabrication of Lithium Secondary Battery Cell

A 18650 cylindrical cell was fabricated according to the same method as Example 2 except for using the negative electrode according to Comparative Example 1.

Comparative Example 4

Fabrication of Lithium Secondary Battery Cell

A 18650 cylindrical cell was fabricated according to the same method as Example 2 except for using the negative electrode according to Comparative Example 2.

Experimental Example 1

Surface Roughness Evaluation

Figure 2:
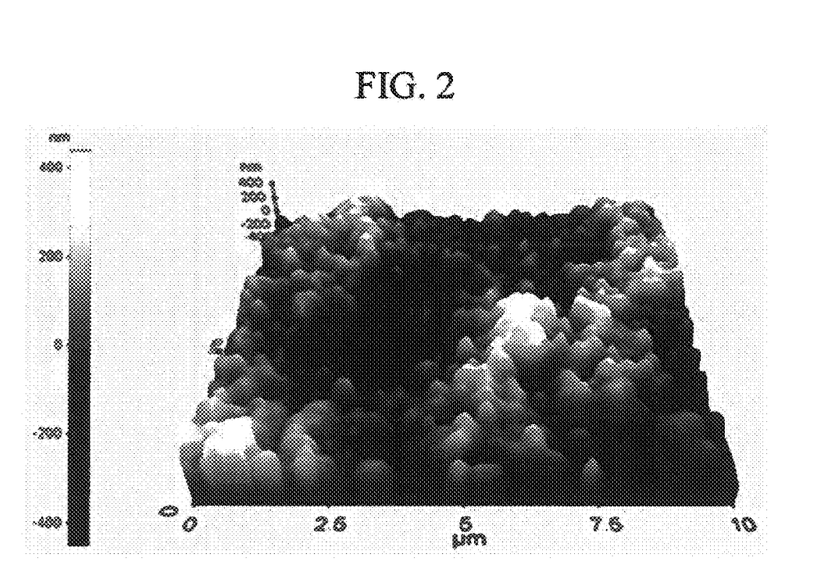
FIG. 2 is an AFM (Atomic Force MicroScope) image showing the surface of the negative electrode according to Example 1.

FIG. 2 shows the AFM (Atomic Force Microscope) image of the surface of the negative electrode according to Example 1. The AFM result is provided in the following Table 1. Based on the AFM result, the negative electrode according to Example 1 had surface roughness of about 886 nm.

TABLE 1

| Minimum (nm) | Maximum (nm) | Middle (nm) | Average (Mean) (nm) | Maximum peak height Rpv (nm) | Root mean square Rq (nm) |
|---|---|---|---|---|---|
| −448.07 | 437.97 | −5.05 | 0.00 | 886.04 | 135.96 |

Figure 3:
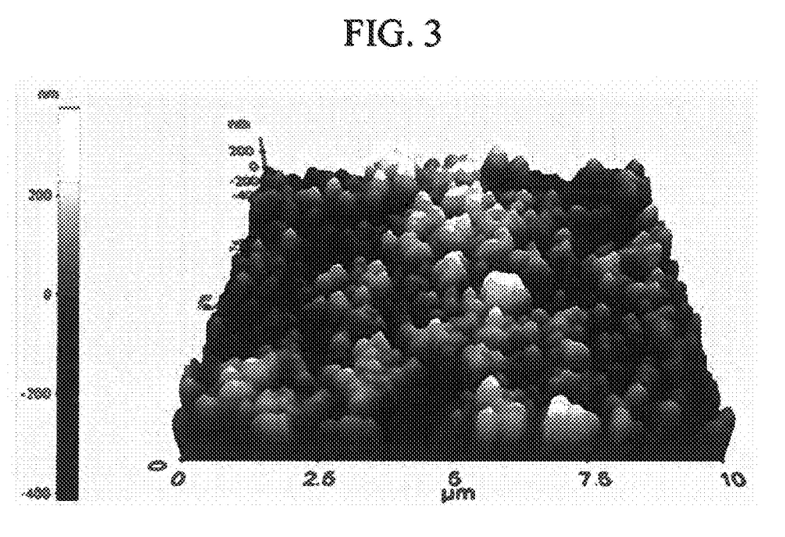
FIG. 3 is an AFM image showing the surface of a negative electrode according to Comparative Example 1.

FIG. 3 shows the AFM image of the surface of the negative electrode according to Comparative Example 1. The AFM result is provided in the following Table 2. Based on the AFM result, the negative electrode according to Comparative Example 1 had surface roughness of about 788 nm.

TABLE 2

| Minimum (nm) | Maximum (nm) | Middle (nm) | Average (Mean) (nm) | Maximum peak height Rpv (nm) | Root mean square Rq (nm) |
|---|---|---|---|---|---|
| −410.86 | 377.55 | −16.65 | 0.00 | 788.40 | 115.68 |

Figure 4:
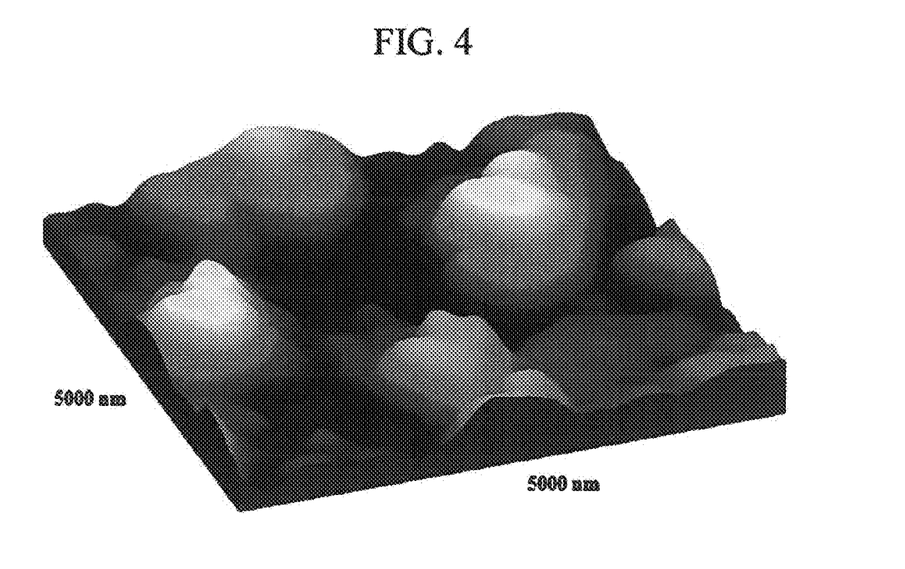
FIG. 4 is an AFM image showing the surface of the negative electrode according to Comparative Example 2.

FIG. 4 shows the AFM image of the surface of the negative electrode according to Comparative Example 2. The AFM result is provided in the following Table 3. Based on the AFM result, the negative electrode according to Comparative Example 2 had surface roughness of about 1203 nm.

TABLE 3

| Minimum (nm) | Maximum (nm) | Middle (nm) | Average (Mean) (nm) | Maximum peak height Rpv (nm) | Root mean square Rq (nm) |
|---|---|---|---|---|---|
| −461.24 | 453.86 | −5.61 | 0.00 | 1203.47 | 140.89 |

Experimental Example 2

Evaluation of Functional Group on the Surface

Figure 5:
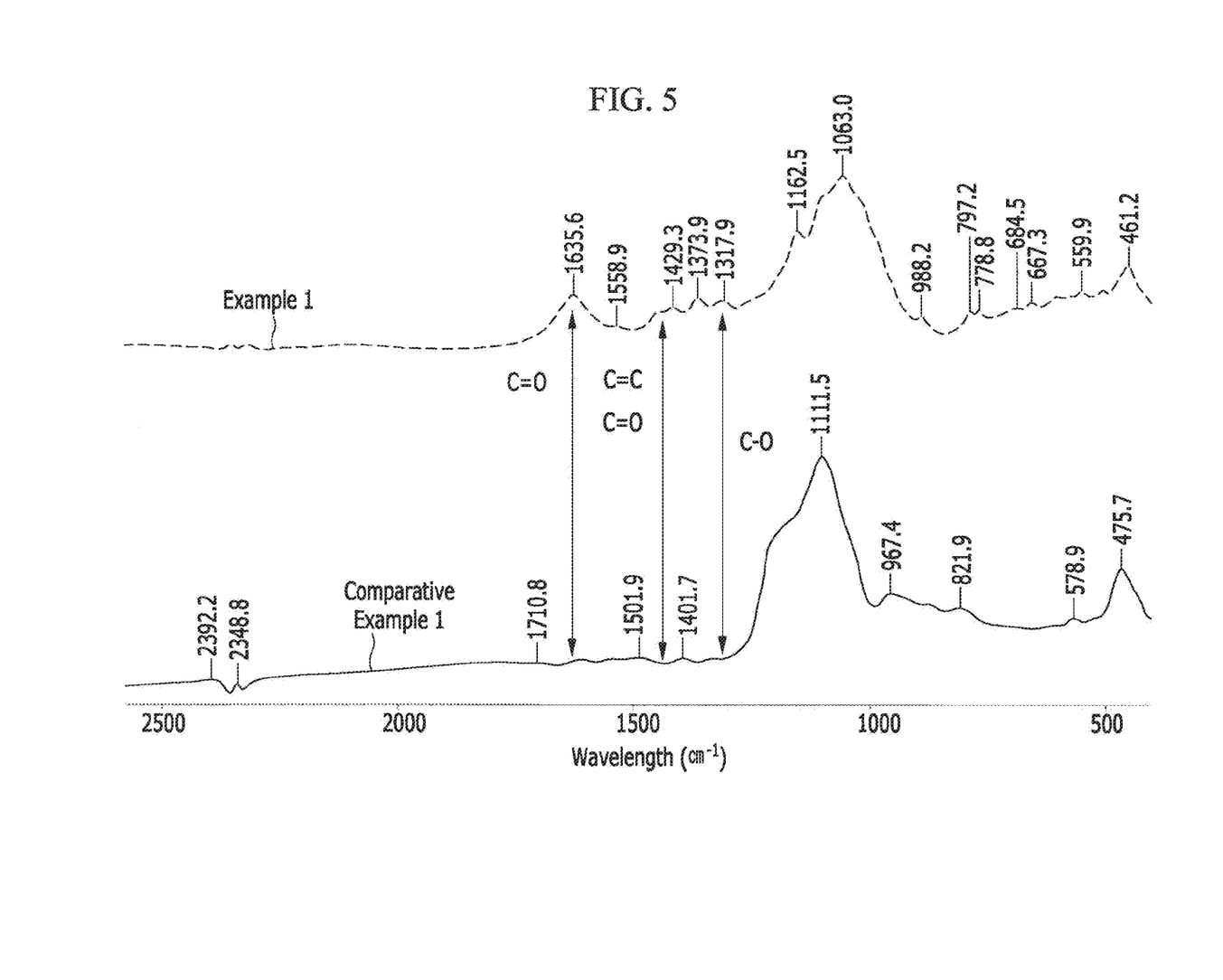
FIG. 5 shows IR spectrum measured on the surface of the negative electrodes according to Example 1 and Comparative Example 1.

FIG. 5 shows IR spectrum of the surface of the negative electrodes according to Example 1 and Comparative Example 1.1 Referring to FIG. 5, the negative electrode according to Example 1 included a ketone (—C(O)—) group (indentified at a peak with a wavelength of about 1710 cm$^{-1}$) and an ester (—C(O)O—) group (at a peak with a wavelength ranging from about 1630 cm$^{-1}$ and about 1270 cm$^{-1}$) on the surface, while the negative electrode according to Comparative Example 1 included no ketone (—C(O)—) and ester (—C(O)O—) groups and thus, no peak on the surface.

Experimental Example 3

Contact Angle and Surface Energy

The negative electrode according to Example 1 was measured regarding each contact angle against water and diiodomethane and surface energy. The results are provided in the following Table 4. The negative electrodes according to Comparative Examples 1 and 2 were also measured regarding contact angle and surface energy. The results are provided in the following Table 4.

TABLE 4

| | | Contact angle | | Surface energy [mN/m] |
|---|---|---|---|---|
| | | Water | Diiodomethane | |
| Before plasma treatment [Comparative Example 1] | | 110.5° | 57.8° | 31.63 |
| After plasma treatment | Example 1 | 64.4° | 27° | 48.4 |
| | Comparative Example 2 | 50.3° | 23.9° | 59.4 |

Experimental Example 4

Cycle-Life Characteristic

Figure 6:
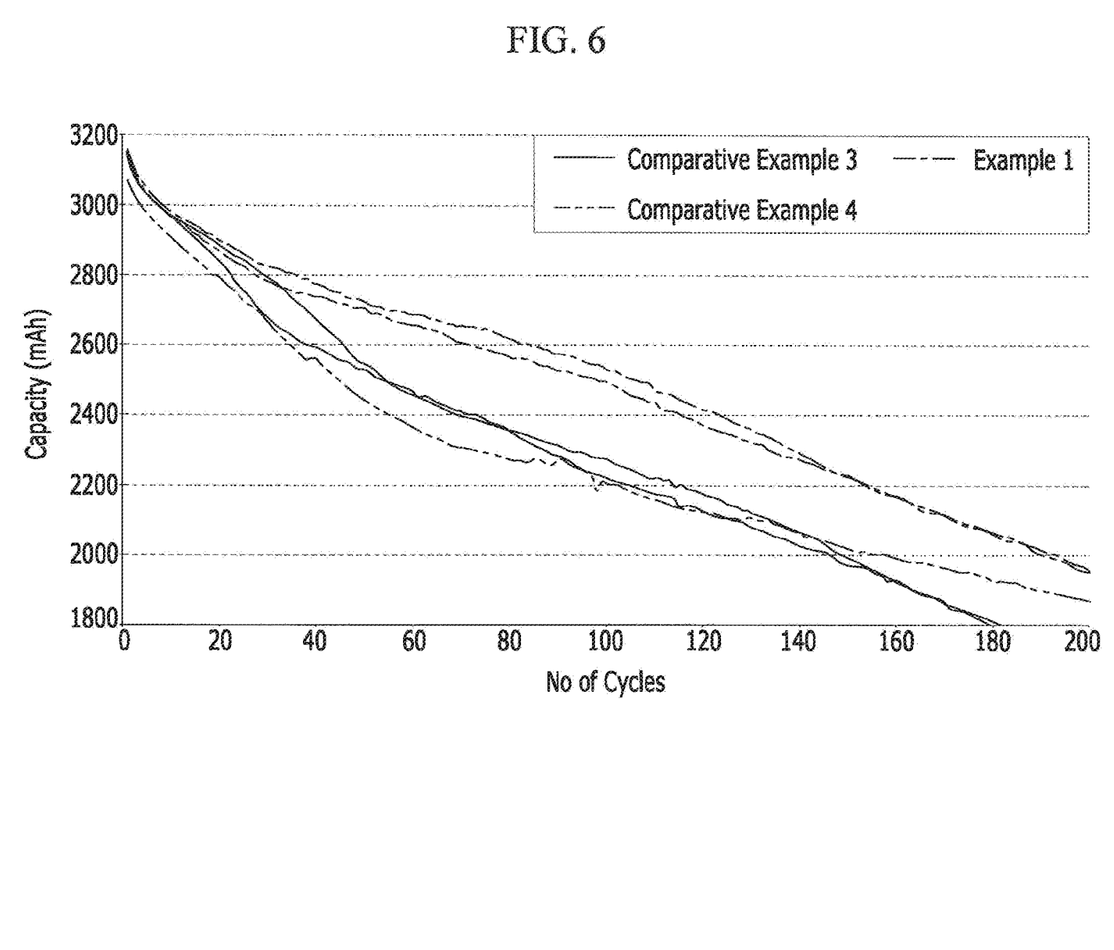
FIG. 6 is a graph showing the cycle-life characteristic of lithium secondary batteries according to Example 3 and Comparative Example 3.

The lithium secondary battery cells according to Example 3 and Comparative Examples 3 and 4 were 300 times charged at 25° C. with 0.5 C and discharged with 1.0 C. The results are provided in FIG. 6. Two lithium secondary battery samples according to Example 3 and Comparative Example 3 were respectively fabricated and measured, while one lithium secondary battery sample according to Comparative Example 4 was fabricated. The results are provided in FIG. 6. FIG. 6 shows that the lithium secondary battery cell according to Example 1 had excellent cycle-life characteristic.

While this disclosure has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims, and equivalents thereof.

What is claimed is:

1. An electrode for a lithium secondary battery, comprising a current collector and an active material layer,
   wherein a surface of the active material layer has a surface roughness (Rpv) of about 800 nm to about 1000 nm.

2. The electrode of claim 1, wherein the surface of the electrode comprises an O (oxygen) atom-containing functional group comprising a ketone group or an ester group.

3. The electrode of claim 1, wherein the surface of the electrode has a surface energy of about 45 mN/cm to about 60 mN/cm.

4. The electrode of claim 1, wherein the surface of the electrode has a contact angle of about 60 degrees to about 80 degrees with respect to water.

5. The electrode of claim 1, wherein the surface of the electrode has a contact angle of about 24 degrees to about 30 degrees with respect to diiodomethane.

6. The electrode of claim 1, wherein the electrode is a negative electrode.

7. The electrode of claim 6, wherein the negative electrode comprises an active material layer comprising a carbon-based negative active material.

8. A method of manufacturing an electrode for a lithium secondary battery, the method comprising:
   preparing an electrode comprising an active material layer on a current collector; and
   radiating atmospheric plasma on a surface of the active material layer of the electrode and then, surface-modifying the surface of the active material layer to have a surface roughness (Rpv) of about 800 nm to about 1000 nm.

9. The method of claim 8, wherein the surface-modifying is performed by radiating atmospheric plasma under a discharge current ranging from about 1800 mA to about 2000 mA and discharge electric power ranging from about 2750 W to about 3000 W.

10. The method of claim 8, wherein the atmospheric plasma is produced by applying two plasma discharge electrodes, the plasma discharge electrodes being spaced about 1 mm to about 3 mm apart from the electrode.

11. The method of claim 8, wherein the atmospheric plasma is produced by applying two plasma discharge electrodes and is radiated therefrom while the plasma discharge electrodes pass the electrode at a speed ranging from about 8 m/min to about 10 m/min.

12. The method of claim 8, wherein the surface-modifying is performed by radiating the atmospheric plasma under about 1 atm to 1.5 atm at about 22° C. to 30° C.

13. A lithium secondary battery comprising:
a first electrode;
a second electrode;
a separator; and
an electrolyte,
wherein the first electrode is the electrode according to claim 1.

14. The lithium secondary battery of claim 13, wherein the first electrode is a negative electrode, and the second electrode is a positive electrode.

15. The lithium secondary battery of claim 13, wherein the electrolyte comprises a fluorine-substituted carbonate-based solvent.

\* \* \* \* \*